United States Patent [19]
Parker

[11] 3,727,945
[45] Apr. 17, 1973

[54] VEHICULAR HITCHING SYSTEM
[75] Inventor: John W. Parker, Irving, Tex.
[73] Assignee: Parker Uptight Trailer Hitch Company
[22] Filed: Mar. 29, 1971
[21] Appl. No.: 129,022

[52] U.S. Cl................280/408, 280/446 R, 280/486
[51] Int. Cl. .............................................B60d 1/02
[58] Field of Search......................280/446, 447, 408, 280/486, 487; 114/235 R

[56] References Cited
UNITED STATES PATENTS

| | | |
|---|---|---|
| 3,125,059 | 3/1964 | Verneaux et al. ................280/486 X |
| 3,062,170 | 11/1962 | Verneaux .........................280/408 X |
| 3,439,937 | 4/1969 | Dixon ...............................280/446 R |
| 2,252,135 | 8/1941 | Oyler................................280/408 X |
| 2,701,145 | 2/1955 | Kunz ................................280/486 X |
| 3,244,434 | 4/1966 | Reed et al.........................280/482 X |
| 3,420,390 | 1/1969 | Taggart ............................280/482 X |
| 2,378,297 | 6/1945 | Hetzler.............................280/458 |

Primary Examiner—Leo Friaglia
Attorney—Richards, Harris & Hubbard

[57] ABSTRACT

A vehicular hitching system includes a shaft supported on a pup trailer for sliding movement outwardly from the front of the trailer, and air cylinders for biasing the shaft inwardly. A pintle hook is secured to the rear of a mother trailer and receives an eye mounted on the shaft. Four rollers are pivotally mounted at the rear corners of the mother trailer, and roller receiving plates extend across the top and bottom of the front surface of the pup trailer. During a relative turning movement between the trailers, two of the rollers engage and thereafter move across the roller receiving plates. During this action the shaft is drawn outwardly from the front of the pup trailer against the action of the air cylinders.

18 Claims, 10 Drawing Figures

PATENTED APR 17 1973 3,727,945

INVENTOR:
JOHN W. PARKER

Richards, Harris & Hubbard
ATTORNEYS

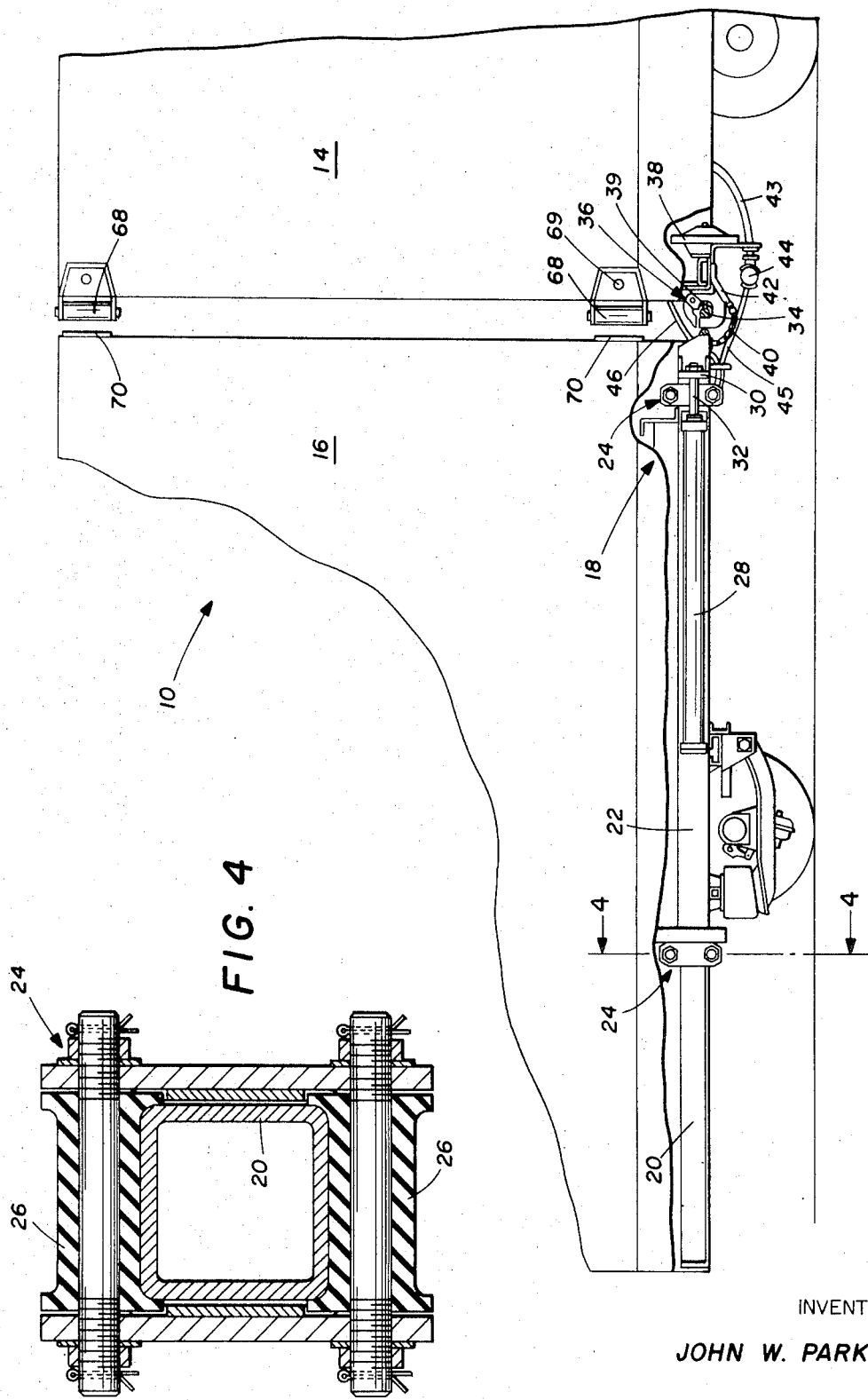

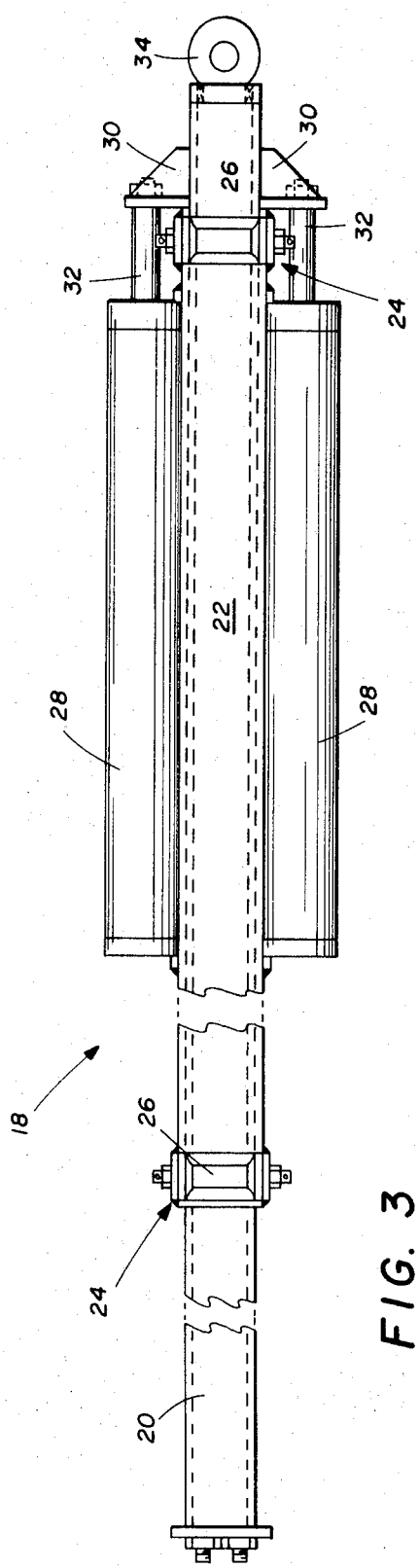
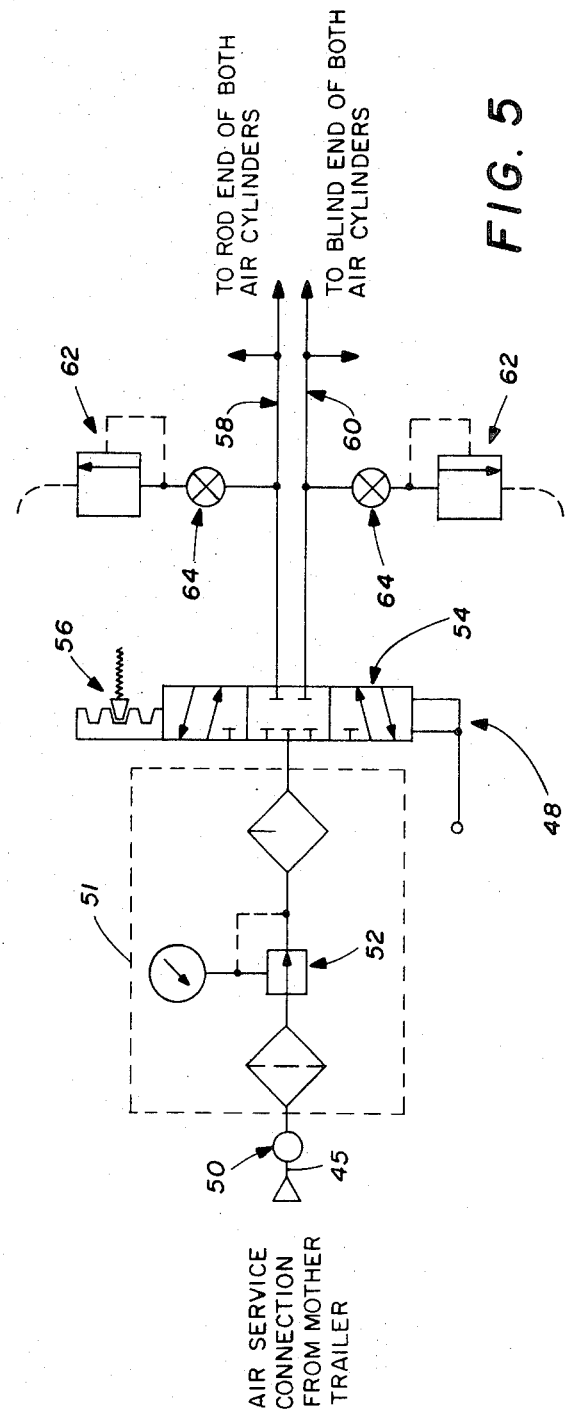

VEHICULAR HITCHING SYSTEM

BACKGROUND AND SUMMARY OF THE INVENTION

This invention relates to a vehicular hitching system, and more particularly to a system for connecting a towed vehicle closely adjacent a towing vehicle, and yet permitting relative turning movements between the vehicles.

In those situations where it becomes desirable to transport a greater amount of cargo than can conveniently be accommodated in a standard semitrailer van, it has become common to connect an auxiliary or "pup" trailer behind a standard or "mother" trailer for transport by the same tractor.

The pup trailer rigs that have been used heretofore have several disadvantages. For example, the drawbar assemblies that are presently employed to connect pup trailers to mother trailers require considerable spacing between the rear of a mother trailer and the front of a pup trailer to permit the two trailers to turn relative to each other. At the same time, the overall length, width and height dimensions of a motor vehicle are limited by State and Federal highway regulations. Thus, any spacing between a mother trailer and a pup trailer results in an appreciable loss of cargo capacity. Further, the pup trailer drawbar assemblies that are currently in use necessitate the positioning of the forward portion of the floor of a pup trailer considerably above the rear portion to accommodate the "dolly" assembly mounted under the front of the pup unit. This also results in a loss of cargo capacity.

Still further, as the pup trailer and mother trailer will not follow the same "track" during a turn, maneuverability of the two trailer vans is sometimes cumbersome.

The present invention comprises a system for connecting pup trailers to mother trailers which overcomes the foregoing and other disadvantages that are characteristic of the prior art. In accordance with the preferred embodiment of the invention, a pup trailer is connected to a mother trailer by a shaft mounted for movement outwardly and inwardly relative to the front of the pup trailer, and corner members are mounted at the rear corners of the mother trailer for engagement with the front of the pup trailer in response to relative turning movements between the trailers. By this means, the pup trailer is positioned closely adjacent the mother trailer, and yet the trailers can be turned relative to each other without difficulty.

DESCRIPTION OF THE DRAWINGS

A more complete understanding of the invention may be had by referring to the following detailed description when taken in conjunction with the accompanying drawings, wherein:

FIG. 2 is an enlarged side view of a portion of the vehicle shown in FIG. 1, and in which certain parts have been broken away to more clearly illustrate certain features of the hitching system;

FIG. 3 is a top view of a portion of the hitching system;

FIG. 4 is a sectional view taken generally along the line 4—4 in FIG. 2 in the direction of the arrows;

FIG. 5 is a schematic illustration of a pneumatic circuit employed in the hitching system;

DETAILED DESCRIPTION

Figure 1:
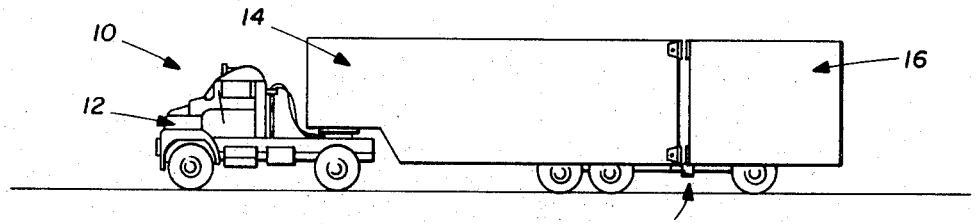
FIG. 1 is a side view of a vehicle including a pup trailer that is connected to the mother trailer by a vehicular hitching system incorporating the invention.
Figure 6:
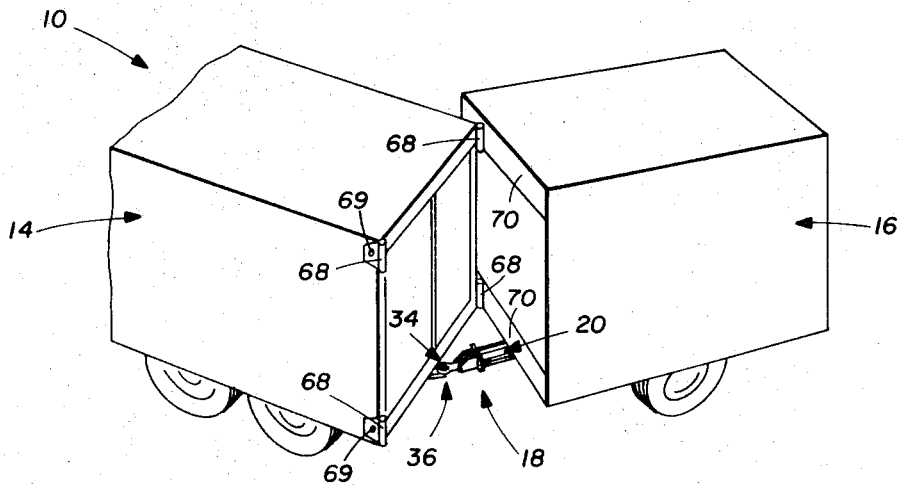
FIG. 6 is a perspective view illustrating the trailers shown in FIG. 1 during a turn.
Figure 7:
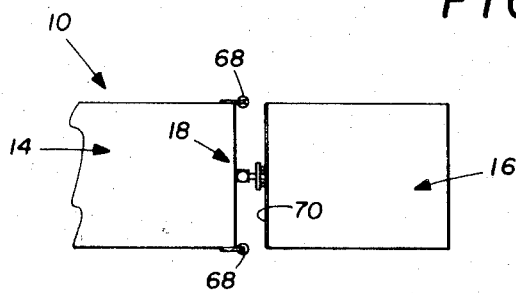
FIGS. 7, 8, 9 and 10 are diagrammatic illustrations of the trailer units during progressive stages of a turn.
Figure 8:
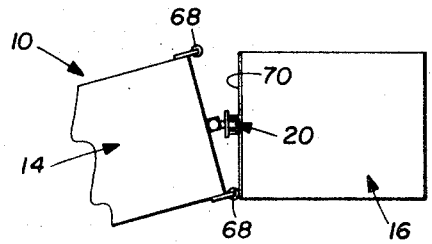
Figure 10:
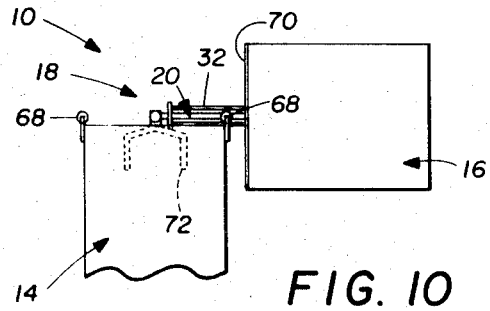
Figure 9:
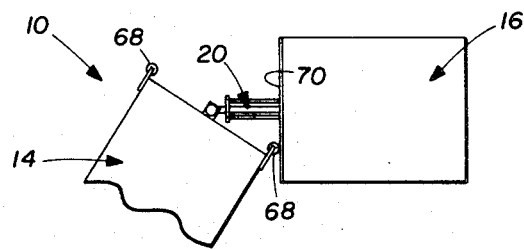

Referring now to the drawings, and particularly to FIG. 1 thereof, there is shown a vehicle 10 suitable for over-the-road transportation of furniture, household goods, and similar cargos of the type traditionally carried in "moving vans." The vehicle 10 includes a conventional tractor 12, a main or "mother" trailer 14, and an auxiliary or "pup" trailer 16 which is connected to the mother trailer 14 by a vehicular hitching system 18 incorporating the present invention.

Referring now to FIGS. 2 and 3, the hitching system 18 includes a square shaft 20 which extends through and is slidably received within a larger square tube 22 and a pair of roller assemblies 24. As is best shown in FIG. 4, each roller assembly 24 comprises a pair of opposed rollers 26 which engage the upper and lower surfaces of the square shaft 20 to facilitate sliding movement of the shaft 20 forwardly and rearwardly of the pup trailer 16. The roller assemblies 24 are mounted on tube 22, and the tube 22 is secured to the frame of the pup trailer 16. The square shaft 20 is prevented from transverse movement with respect to the pup trailer 16 because it is mounted within tube 22 which is securely attached to pup trailer 16.

As is best shown in FIG. 3, a pair of air cylinders 28 are secured to the opposite sides of the square tube 22. A pair of brackets 30 are fixed to the opposite sides of the square shaft 20, and each air cylinder 28 includes a forwardly extending piston rod 32 which is fixed to one of the brackets 30. During normal use of the hitching system 18, the rod ends of the air cylinders 28 are energized with compressed air, whereby the square shaft 20 is normally biased inwardly toward the position shown in FIGS. 2 and 3.

Referring again to FIG. 2, the mother trailer 14 and the pup trailer 16 are interconnected by an eye 34 which is fixed to the proximal end of the square shaft 20, and which is normally received in a conventional pintle hook 36. The pintle hook 36 is secured to the extreme rear of the mother trailer 14 and is provided with an air cylinder 38 which upon engagement of the eye 34 with hook 36 urges a rubber pin 39 forward to minimize movement between the eye 34 and the pintle hook 36. The trailers 14 and 16 are further interconnected by a pair of safety chains 40 which extend between the square shaft 20 and a U-bolt 42 mounted on the trailer 14. Service and emergency compressed air for the pup trailer 16 is provided through lines 43 and 45 which are connected by conventional glad hands 44, and electrical power is provided through an electrical line 46 and a conventional electrical connector (not shown).

Referring now to FIG. 5, a pneumatic circuit 48 for the hitching system 18 is schematically illustrated. The circuit 48 is mounted on the pup trailer 16 and receives compressed air from the tractor 12 through air line 45. Compressed air moved by the circuit 48 is directed through a reservoir 50 into a conventional brake proa pair of corner members, one mounted at one corner of the adjacent end of the first vehicle for engagement with and for transverse movement relative to the adjacent end of the second vehicle in response to relative turning movements between the vehicles in one direction, and the other mounted at the other corner of the adjacent end of the first vehicle for engagement with and for transverse movement relative to the adjacent end of the second vehicle in response to relative turning movements between the vehicles in the other direction; and means pivotally interconnecting the first and second vehicles for biasing the vehicles toward one another and extensible relative to one of said vehicles to permit relative turning movement therebetween.

2. The vehicular hitching system according to claim 1 wherein the corner members comprise rollers mounted on the first vehicle and positioned between the adjacent ends of the vehicles.

3. The vehicular hitching system according to claim 1 wherein the biasing means includes a member mounted on the second vehicle for movement outwardly of the adjacent end thereof and means for continuously urging the outwardly moving member to move inwardly of the adjacent end of the second vehicle.

4. The vehicular hitching system according to claim 3 wherein the urging means comprises a fluid spring connected between the second vehicle and the outwardly moving member.

5. The vehicular hitching system according to claim 1 wherein the means interconnecting the vehicles comprises an elongate shaft and further including means for slidably supporting the shaft on the second vehicle.

6. The vehicular hitching system according to claim 5 further including an air cylinder connected between the second vehicle and the shaft for urging the shaft to move inwardly relative to the adjacent surface of the second vehicle and relief valve means for maintaining a substantially constant pressure within the air cylinder during turning movements between the vehicles.

7. A vehicular hitching system comprising:
a towed vehicle having a reinforced front surface;
a towing vehicle;
a pair of rollers mounted at the opposite rear corners of the towing vehicle for engagement with and for movement across the reinforced front surface of the towed vehicle in response to relative turning movements between the vehicles;
a member mounted on the towed vehicle for sliding movement forwardly and rearwardly thereof;
means biasing the sliding member for movement rearwardly of the towed vehicle, and
means pivotally interconnecting the forward end of the sliding member and the rear of the towed vehicle and extensible relative to one of said vehicles to permit relative turning movement therebetween.

8. The vehicular hitching system according to claim 7 wherein the pair of rollers is mounted at the upper ends of the opposite rear corners of the towing vehicle and further including an additional pair of rollers mounted at the lower ends of the opposite rear corners of the towing vehicle and an additional reinforced front surface on the towed vehicle for engagement by the additional pair of rollers.

9. The vehicular hitching system according to claim 7 wherein the sliding member comprises an elongate shaft and further including guide means supporting the shaft on the towed vehicle for sliding movement forwardly and rearwardly thereof.

10. The vehicular hitching system according to claim 9 wherein the guide means prevents movement of the shaft transversely of the towed vehicle.

11. The vehicular hitching system according to claim 7 wherein the biasing means comprises an air cylinder connected between the member and the towed vehicle and means for maintaining substantially constant pressure within the air cylinder.

12. The vehicular hitching system according to claim 11 further including means for selectively extending and retracting the air cylinder and thereby controlling the distance between the towing vehicle and the towed vehicle.

13. The vehicular hitching system according to claim 7 wherein the interconnecting means comprises a pintle hook mounted on the rear of the towing vehicle and an eye mounted on the proximal end of the sliding member and received in the pintle hook.

14. The vehicular hitching system comprising:
a towing vehicle having a rear end;
a towed vehicle having a front end;
a pintle hook fixed to the towing vehicle adjacent the rear end thereof;
a first roller mounted at one corner of the rear end of the towing vehicle for engagement with and thereafter for transverse movement across the front end of the towed vehicle in response to relative turning movements between the vehicles in one direction;
a second roller mounted at the other corner of the rear end of the towing vehicle for engagement with and thereafter for transverse movement across the front end of the towed vehicle in response to relative turning movements between the vehicles in the other direction;
a member mounted on the towed vehicle for outward and inward movement relative to the front end thereof;
means biasing the member for inward movement relative to the front end of the towed vehicle, and
an eye mounted on the distal end of the member and received by the pintle hook.

15. The vehicular hitching system according to claim 14 wherein the pintle hook is positioned midway between the corners of the rear end of the towing vehicle, and wherein the member is positioned midway between the corners of the front end of the towed vehicle.

16. The vehicular hitching system according to claim 14 wherein the member comprises an elongate shaft and further including means for supporting the shaft on the towed vehicle, for permitting sliding movement of the shaft inwardly and outwardly relative to the front end of the towed vehicle, and for preventing movement of the shaft transversely of the front end of the towed vehicle.

17. The vehicular hitching system according to claim 14 wherein the biasing means comprises at least one pneumatic cylinder connected between the towed vehicle and the member for urging the member to move inwardly relative to the front end of the towed vehicle.

18. The vehicular hitching system according to claim 17 further characterized by means for selectively extending and retracting the pneumatic cylinder and thereby selectively controlling the distance between the towed vehicle and the towing vehicle.

* * * * *